United States Patent
Pieczul

(10) Patent No.: US 7,096,399 B2
(45) Date of Patent: Aug. 22, 2006

(54) MONITORING PACKET CONTENT

(75) Inventor: Pawel Pieczul, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 497 days.

(21) Appl. No.: 10/661,365

(22) Filed: Sep. 11, 2003

(65) Prior Publication Data

US 2005/0063406 A1 Mar. 24, 2005

(51) Int. Cl.
*H03M 13/35* (2006.01)
(52) U.S. Cl. .................. 714/748; 714/749; 714/776
(58) Field of Classification Search ........ 714/807–808; 712/2, 8
See application file for complete search history.

(56) References Cited

U.S. PATENT DOCUMENTS 6,643,821 B1 * 11/2003 Karim et al. ............... 714/807
2001/0042187 A1 * 11/2001 Tremblay ..................... 712/2

* cited by examiner

*Primary Examiner*—R. Stephen Dildine
(74) *Attorney, Agent, or Firm*—Fish & Richardson P.C.

(57) ABSTRACT

A method includes, producing in an engine thread included in a processor that processes packets, a vector that represents content of a packet, and storing the vector in a memory associated with the processor such that the vector is accessible by another engine thread included in the processor.

36 Claims, 4 Drawing Sheets

MONITORING PACKET CONTENT

BACKGROUND

Networks are used to distribute information among computer systems. Typically packets or cells are transmitted and received over networks that connect the computer systems. With packets for instance, to determine the appropriate destination of each packet, processors such as microprocessors, central processing units (CPU's), and the like access header data stored in each packet to identify the appropriate destination. As the packets are transmitted and received the header data no longer needed is often removed. Alternatively, additional header data may be inserted into the packets to direct the packets to other appropriate destinations. Additionally, after adding or removing header data, some processors such as network processors insert data into each packet for later verifying that packet content has not been lost or erroneously added during transmission of the packet.

DESCRIPTION

Figure 1:
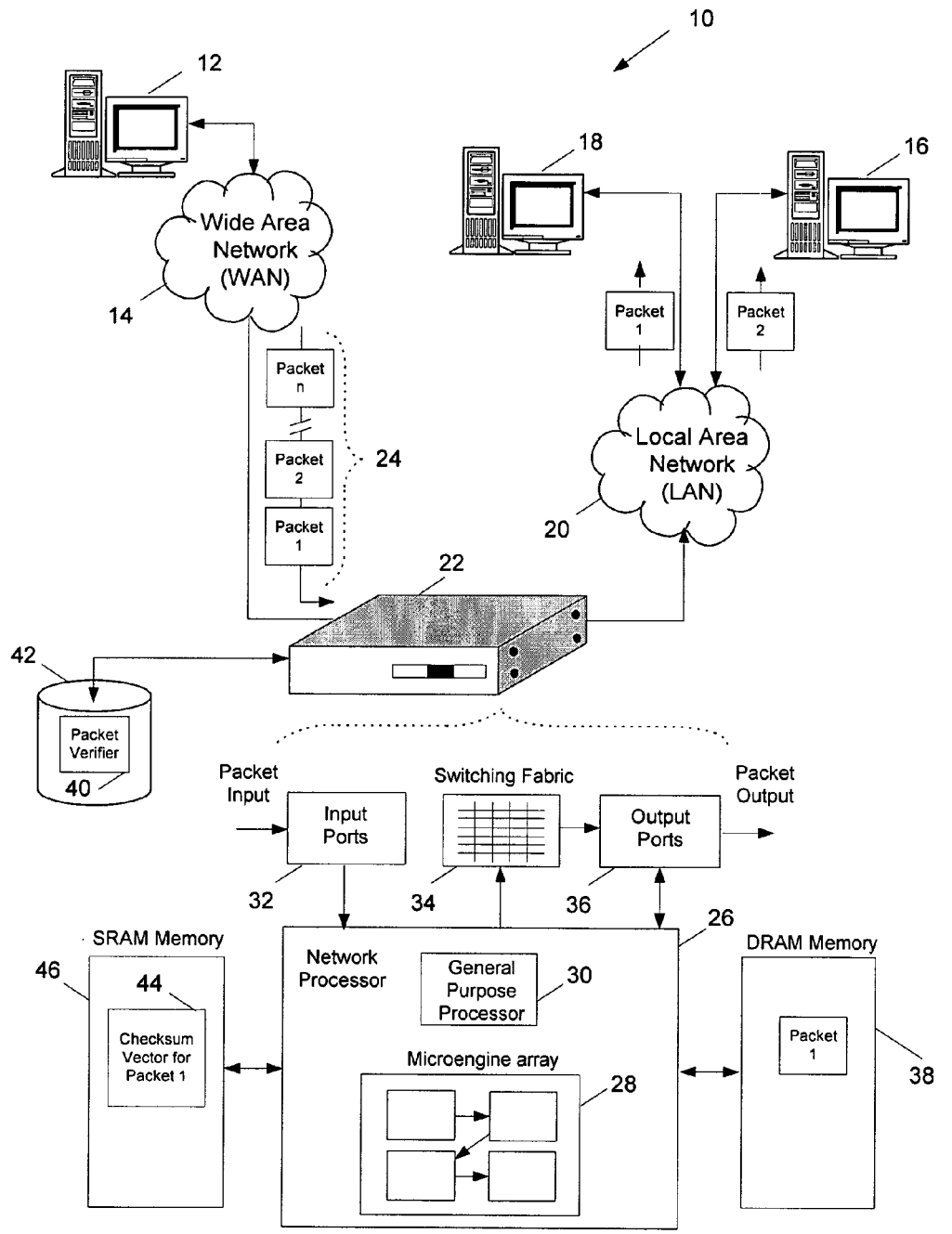
FIG. 1 is a block diagram depicting a system for processing packets.

Referring to FIG. 1, a system 10 for transmitting packets from a computer system 12 through a wide area network (WAN) 14 to other computer systems 16, 18 through a local area network (LAN) 20 includes a router 22 that collects a stream of "n" packets 24 and verifies that each packet has not lost data or acquired additional data during transmission through WAN 14. Additionally, each packet is verified for content corruption during transmission. Upon verification, each of the packets are transmitted through the LAN 20 for delivery to the appropriate destination computer system 16 or computer system 18. In this example, after verification, packet 1 is transmitted for delivery at computer system 18 and packet 2 is transmitted for delivery at computer system 16.

To verify each of the packets prior to delivery, the router 22 includes a network processor 26 that processes the packet stream 24 with an array of, e.g., four programmable multi-threaded microengines 28. Each microengine executes instructions that are associated with an instruction set (e.g., a reduced instruction set computer (RISC) architecture) used by the array of microengines 28 included in the network processor 26. Additionally, each microengine has e.g., four threads that allow multiple processes to be executed by interleaving the execution of the instructions associated with the processes. Typically the instruction set is designed for specific use by the array of microengines 28, which processes the instructions relatively quickly, for example, compared to instruction processing by a general-purpose processor.

Each one of the microengines included in the array of microengines 28 has a relatively simple architecture and quickly executes relatively routine processes (e.g., packet verifying, packet classifying, packet forwarding, etc.) while leaving more complicated processing (e.g., look-up table maintenance) to other processing units such as a general-purpose processor 30 (e.g., a StrongArm processor of ARM Limited, United Kingdom) also included in the network processor 26.

Typically the packets are received by the router 22 on one or more input ports 32 that provide a physical link to the WAN 14 and are in communication with the network processor 26 that controls the entering of the incoming packets. The network processor 26 also communicates with a switching fabric 34 that directs the packets to output ports 36. However, in some arrangements the router 22 does not include the switching fabric 34 and the network processor 26 assists in interconnecting the input ports 32 and the output ports 36. The output ports 36, which are also in communication with the network processor 26, are used for scheduling transmission of the packets to the LAN 20 for reception at the appropriate computer system 16 or 18. In this particular example, the router 22 uses the network processor 26 to distribute the stream of "n" packets 24, however, in other arrangements a hub, switch, of other similar network forwarding device includes the network processor for distributing the packets.

Typically, incoming packets are entered into a dynamic random access memory (DRAM) 38 in communication with the network processor 26 so that they are accessible by the microengine array 28 for determining the destination of each packet or to execute other processes. In this particular example packet 1 of the packet stream 24 is shown residing in DRAM 38. In some arrangements as one or more of the microengines process packet 1, data such as header data is inserted into or removed from the packet. By inserting or removing header data, the length of the packet correspondingly grows or is reduced. Additionally, by adding and removing header data to the front of the packet, the relative position of each data byte changes with respect to the first data byte in the packet. This alignment change of the packet content effects the processing of the packet by the microengine array 28. For example, after packet 1 is received by the router 22, the network processor 26 verifies that no data has been lost from or added to packet 1 during transmission along with verifying that the packet contents has not been corrupted during transmission. If data has been lost, added, or corrupted, causing a misalignment, the packet fails verification and re-transmission may be requested.

Typically to verify a packet, network processor 26 calculates a checksum value from the data included in the packet and compares this calculated checksum value with another checksum value that was inserted into the packet prior to transmission to the router 22. In some arrangements, the checksum value is a count of the number of, e.g., bytes included in a packet. By determining whether the checksum value inserted into the packet matches the checksum value calculated by the network processor 26, a verification unit can verify that no data have been lost from or added to the packet while also verifying that packet content has not been corrupted.

However, in some arrangements as a packet is processed by microengines included in the microengine array 28, header data, payload, or other packet content is removed from or added to packet 1. So, as the packet is accessed and processed by the microengines, alignment changes can occur and need to be accounted for such that when verifying the packet locally (e.g., by another microengine in the array) or at another location (e.g., computer system 18), the checksum value inserted in the packet is updated to reflect the modifications made to packet.

In this particular example, a packet verifier 40 is used to calculate the checksum value of packet 1 for comparing with the checksum value included in packet 1. Also in this particular example, the packet verifier 40 is stored on a storage device 42 (e.g., a hard drive, CR-ROM, etc.) that is in communication with router 22. However, in other arrangements the packet verifier 40 resides in memory (e.g., RAM, ROM, SRAM, DRAM, etc.) in communication with the network processor 26.

To verify the checksum value included in packet 1 and to update the checksum value as packet 1 is processed, the packet verifier 40 produces a checksum vector 44 that is stored in a static random memory (SRAM) 46 that is in communication with the network processor 26. The checksum vector includes vector elements that represent the content of packet 1 as the packet is modified by processing. Typically, one microengine in the array 28 reads the contents of packet 1 from DRAM 38 and produces and stores the checksum vector 44 in SRAM 46.

Typically, the SRAM 46 provides relatively quicker access than DRAM 38, so the checksum vector 44 is quickly accessible by the microengines to calculate the checksum value, to update the checksum vector to reflect processing of packet 1, or to perform other similar processing for verifying the contents of packet 1. By using the checksum vector 44, the number of clock cycles needed for verifying is reduced since the content of packet 1 is accessed typically once to produce the vector and additional processing on the packet is accounted for by updating the vector and not by re-accessing the modified packet in the relatively slower accessible DRAM 38. Also, since the checksum vector is updated to reflect processing of packet 1, one or more of the microengines do not need to access a modified packet 1 to determine the modifications of the packet. By using the checksum vector 44 each microengine can account for the processing of packet 1 and, for example, determine the checksum value associated with the modified packet without redundantly accessing the modified packet.

Figure 2:
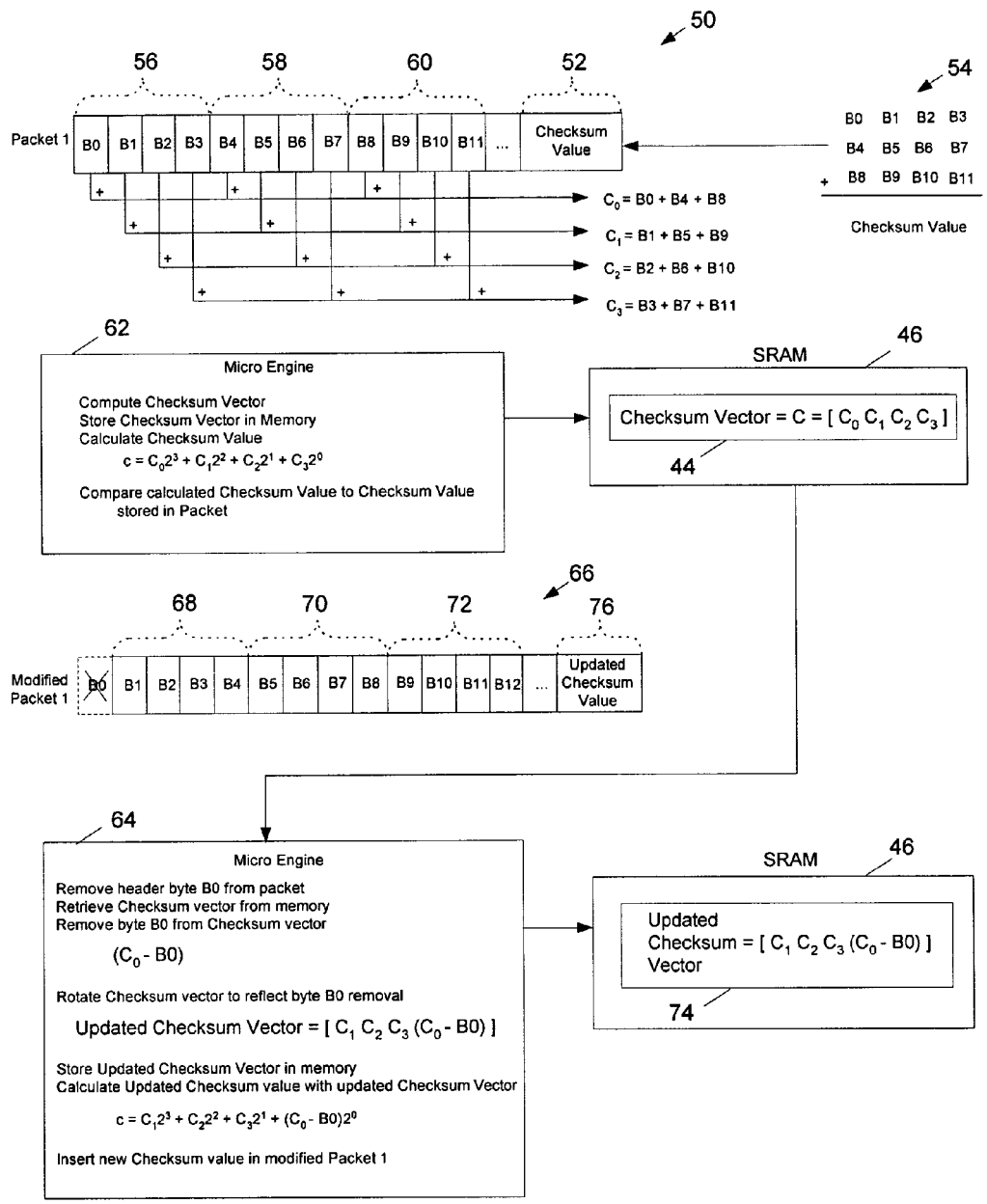
FIG. 2 is a block diagram pictorially depicting processing of a packet by an array of microengines.

Referring to FIG. 2, packet 1 is represented as a block diagram 50 that includes bytes (i.e., bytes B0, B1, ..., B11, etc.) that store binary information carried by the packet such as headers, payload, or other packet content. Additionally, packet 1 includes data that stores the checksum value 52 determined from the bytes included in packet 1.

In this particular example, the checksum value 52 is the sum of the included bytes grouped into four-byte long words. Typically all of the bytes in a packet are used to calculate the checksum value 52, but in this example only bytes B0–B11 are used for ease of understanding. As represented in summation 54, to calculate the checksum value the bytes B0–B11 are grouped into three four-byte words 56, 58, and 60 (i.e., B0 B1 B2 B3, B4 B5 B6 B7, B8 B9 B10 B11) and the three four-byte words 56, 58, 60 are summed to produce the checksum value 52. Additionally, in some arrangements if the summation 54 produces a carry-over amount and the carry-over is added to the checksum value 52. Also, in this particular example, while the bytes are grouped into four-byte words 56, 58, and 60 to produce the checksum value, in other arrangements the data is grouped into words of lengths longer or short than four bytes.

Typically, after the checksum value 52 is calculated, it is inserted into packet 1 for verification at reception sites. For example, computer system 12 calculates and inserts the checksum value 52 into packet 1 prior to transmitting to the router 22 over the WAN 14. When received at the router 22, packet 1 is verified by the packet verifier 40 to assure that data has not been lost, inadvertently inserted, or corrupted and cause a byte misalignment.

In this particular example microengine 62, which is one of the microengines included in the microengine array 28, executes the packet verifier 40 to access received packet 1 and calculate a checksum value from the data (e.g., bytes B0–B11) included in packet 1. Typically, the packet verifier 40 is executed by one or more threads associated with the microengine 62. In this particular example bytes B0–B11 are used to calculate the checksum value, however as mentioned, typically more bytes are used and in some cases all the bytes included in packet 1 are used to calculate the checksum value. After calculating the checksum value, the packet verifier 40 compares the calculated checksum value with the checksum value 52 stored in packet 1.

To calculate the checksum value, the packet verifier 40 computes the checksum vector 44, C, from the data included in packet 1. In this arrangement, the checksum vector 44 includes vector elements that are sums of the bytes at the same respective positions within each four-byte word 56, 58, and 60. For example, the first element of the checksum vector, $C_0$, includes the sum of the most significant bytes (MSB) (i.e., B0, B4, and B8) of each four-byte word. The next element of the checksum vector 44, $C_1$, includes the sum of the bytes (i.e., B1, B5, and B9) in the next position of each four-byte word and the third element, $C_2$, of the checksum vector 44 includes the sum of the bytes in the next following position of each four-byte word 56, 58, 60. The last element of the checksum vector 44, $C_3$, includes the sum of the least significant bytes (LSB) (i.e., B3, B7, and B11) of each four-byte word. In general, each element of the checksum vector 44 is determined by grouping the data included in the packet into i words of n-byte length, which are represented as:

$$B_i = (B_{i,1}, B_{i,2}, \ldots B_{i,n}). \tag{1}$$

By summing the bytes located in the same position of each n-byte word, the checksum vector, C, is represented as:

$$C = (C_1, C_2, \ldots, C_n) = \left( \sum_i B_{i,1}, \sum_i B_{i,2}, \ldots, \sum_i B_{i,n} \right). \tag{2}$$

Here $B_{i,1}$ represents the MSB of the n-byte word i, $B_{i,2}$ represents the next less significant byte of the n-byte word i, and $B_{i,n}$ represents the LSB of the n-byte word i.

After the checksum vector 44 is computed by executing the packet verifier 40 with one or more threads associated with the microengine 62, the checksum vector is stored into SRAM 46 that is in communication with the network processor 26. By storing the checksum vector 44, the vector is accessible by other microengines included in the array 28 and can be used to calculate the checksum value associated with the packet without taking additional time to re-access packet 1 in the relatively slower accessible DRAM 38. Additionally, the stored checksum vector 44 can be updated to reflect modifications to packet 1. For example if another microengine removes or adds one or more bytes from packet 1, the checksum vector 44 is relatively quickly updated by the packet verifier 40 to reflect the modifications of packet 1.

Furthermore, to verify the checksum value included in packet 1, the packet verifier 40 is capable of calculating the checksum value from the checksum vector 44 and comparing it to the checksum 52 inserted prior to reception of the packet. To calculate the checksum value, c, the packet verifier 40 accesses the checksum vector 44 and shifts each vector element to the appropriate position of each n-byte word and then sums the shifted vector elements. In general the checksum value is calculated as:

$$c = C_n 2^0 + C_{n-1} 2^1 + C_{n-2} 2^2 + \ldots C_1 2^{n-1} \qquad (3)$$

In the particular example, since a four-byte word is used and the checksum vector element use a base 0 index, the checksum value is determined by:

$$c = C_3 2^0 + C_2 2^1 + C_1 2^2 + C_0 2^3 \qquad (4)$$

Along with summing the shifted vector elements to produce the checksum value, in some arrangements a carry-over is also included in the addition. For example, after the shifted vector elements are summed, a carry-over is determined and added by logically removing (e.g., "masking") the carry-over, shifting the carry-over to the least significant byte, and summing the masked checksum value with the shifted carry-over. In some protocols, such as the User Datagram Protocol (UDP), the checksum value typically includes carry-over data and the addition of the carry-over is representable as:

$$c_{UDP} = (c \& 0 \times FFFF) + (c >> 16). \qquad (5)$$

After calculating the checksum vector 44 and storing in SRAM 46, the vector is accessible be other microengines. For example, as packet 1 is processed by other microengines included in the microengine array 28, the microengines access and update the checksum vector 44 to reflect modifications made to packet 1.

In this particular example, microengine 64, which is also included in the microengine array 28, removes the first byte (i.e., B0) from packet 1. In some arrangements, by removing the byte B0 from packet 1, a portion of header data included in the packet is removed. To reflect the removal of byte B0 in the checksum vector 44, the microengine retrieves the checksum vector 44 from SRAM 46. As represented by block diagram 66, packet 1 is modified by removing byte B0. However, alternative to removing one or more bytes from packet 1, in other examples one or more bytes are added to packet 1. For example, new header data may be added to the packet by inserting of one or more bytes.

After microengine 64 removes byte B0 from the packet 1 and retrieves the checksum vector 44 from SRAM 46, microengine 64 executes the packet verifier 40 with one or more threads to update the checksum vector. In this example, to update the checksum vector 44 the packet verifier 40 subtracts byte B0 from the appropriate vector element of the checksum vector. Since byte B0 is included in the sum represented by element $C_0$, B0 is subtracted from element $C_0$.

By removing B0 from packet 1, byte B1 is now the first byte of modified packet 1, and relative to packet 1, the modified packet 1 is misaligned by one byte (i.e., removed byte B0). Based on the alignment change, bytes B1, B5, and B9 are now the MSBs of the modified packet 1. Correspondingly the three four-byte words 56, 58, and 60 of packet 1 are shifted in alignment by one byte with respect to the corresponding three four-byte words 68, 70, and 72 of modified packet 1. Based on this alignment, the checksum vector 44 needs to be updated for calculating the checksum value.

To update the checksum vector 44 to reflect the one-byte alignment change based on the removal of byte B0, the packet verifier 40 rotates the elements of the checksum vector one position to the left. So, in this example, element $C_1$ rotates to the left-most position of checksum vector 44 to reflect that bytes B1, B5, and B9 are now in the MSB positions of the four-byte words 68, 70, and 72. Element $C_2$ and $C_3$ are similarly rotated by one position. Element $C_0$ is rotated to the right-most position of the checksum vector to reflect that the bytes included in element $C_0$ (i.e., byte B4, B8, and B12) are now the LSB positions of the four-byte words 68, 70, and 72. In an alternative example, if one or more bytes were added to packet 1, the bytes would be added to the appropriate vector elements (e.g., C0, C1, C2, and/or C3) of the checksum vector 44 and the vector elements are rotated to the right to reflect the alignment change due to the additional bytes.

This particular example, based on the removal of byte B0 and the corresponding alignment change, the packet verifier 40 produces an updated checksum vector 74:

$$\text{Updated Checksum Vector} = [C_1 C_2 C_3 (C_0 - B0)] \qquad (6)$$

After the packet verifier 40 produces the updated checksum vector 74, in some arrangements microengine 64 stores the updated checksum vector 74 in SRAM 46 so that the vector is accessible by other microengines included in the array 28. In this particular example, microengine 64 also uses the packet verifier 40 to calculate an updated checksum value 76 from the updated checksum vector 74. Typically, microengine 64 inserts the updated checksum value 76 into modified packet 1 for use by another microengine or other device (e.g., computer system 18) in verifying the contents of modified packet 1. In this example, microengine 64 calculates the updated checksum value 76 as:

$$c = (C_0 - B0) 2^0 + C_3 2^1 + C_2 2^2 + C_1 2^3 \qquad (7)$$

Additionally, in some arrangements the updated checksum value 76 applies a carry-over to the updated checksum value using an operation such as shown in (3).

Figure 3:
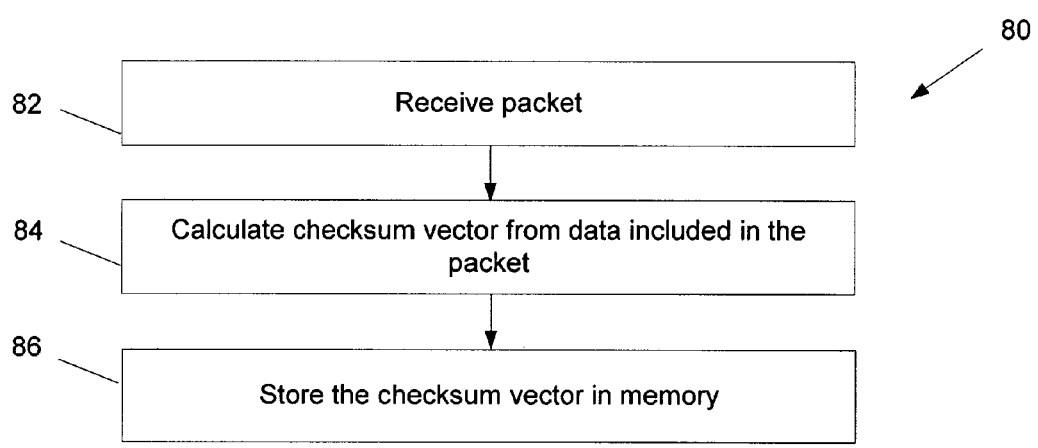
FIG. 3 is a flow chart of a portion of a packet verifier.

Referring to FIG. 3, an example of a checksum vector calculation process 80 of packet verifier 40 includes receiving 82 a packet (e.g., packet 1) from a memory such as DRAM 38. After receiving 82 the packet, the checksum vector calculation process 80 calculates 84 a checksum vector from the data included in the packet and stores 86 the checksum vector in memory such as SRAM 46, which provides relatively quicker access times than DRAM 38. By storing the checksum vector in SRAM 46, microengines included in microengine array 28 can access the checksum vector to calculate a checksum value for comparing to a checksum value stored in the packet to verify the contents of the packet.

Figure 4:
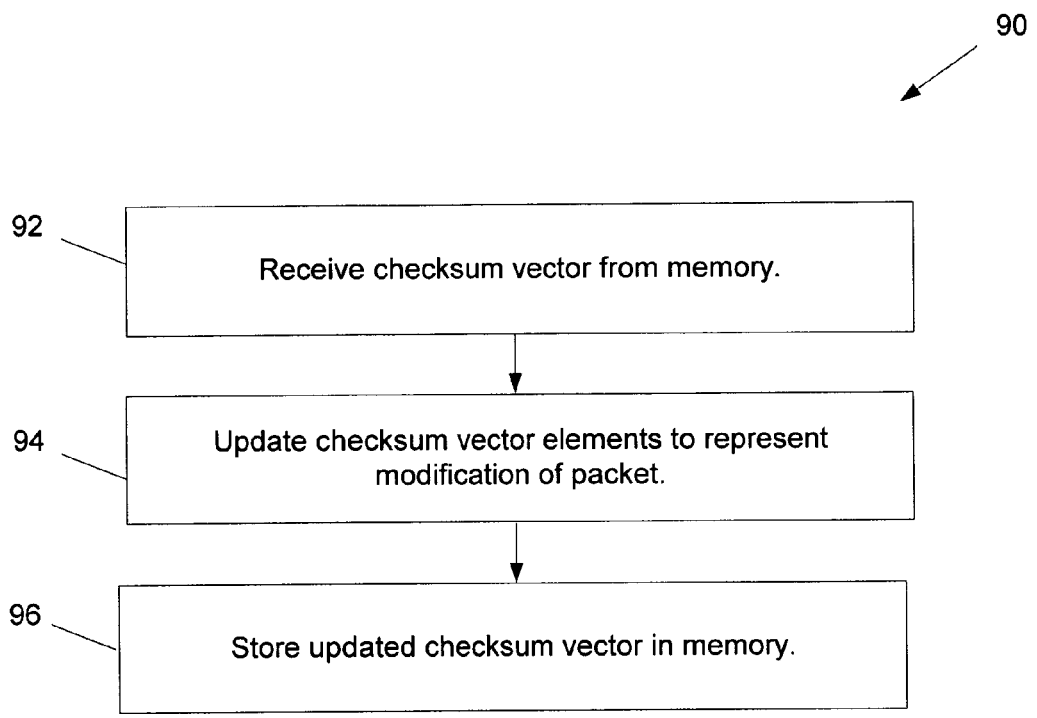
FIG. 4 is a flow chart of another portion of a packet verifier.

Referring to FIG. 4, an example of an update process 90 for the packet verifier 40 includes receiving 92 a checksum vector from memory such as SRAM 46. After the checksum vector is received 92, the update process 90 updates 94 the elements of the checksum vector to reflect one or more modifications applied to the packet associated with the checksum vector. For example, if one or more bytes are added or removed from the packet, the bytes are correspondingly added or removed from the appropriate elements of the checksum vector. Additionally to update the checksum vector, the update process 90 rotates the elements of the checksum vector to reflect alignment changes of the packet based on e.g. the adding or removing of the bytes from the packet. After updating 94 the checksum vector, the update process 90 stores 96 the updated checksum vector in the memory (e.g., SRAM 46) for quick access by one or more microengines included in the microengine array 28 of the network processor 26.

The packet verifier 40 can be implemented in digital electronic circuitry, or in computer hardware, firmware, software, or in combinations of them. The packet verifier 40 described herein can be implemented as a computer program product, i.e., a computer program tangibly embodied in an information carrier, e.g., in a machine-readable storage device or in a propagated signal, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims. For example, the operations of the packet verifier 40 can be performed in a different order and still achieve desirable results.

What is claimed is:

1. A method comprising:
producing in a first engine thread included in a processor that processes packets, a vector that represents content of a packet; and
storing the vector in a memory associated with the processor such that the vector is accessible by a second engine thread included in the processor.

2. The method of claim 1, wherein producing the vector includes grouping and summing the content of the packet to produce vector elements.

3. The method of claim 1, further comprising:
updating the vector on the second engine thread included in the processor.

4. The method of claim 3, further comprising:
storing the updated vector in the memory such that the updated vector is accessible by a third engine thread included in the processor.

5. The method of claim 3, wherein updating the vector includes subtracting a byte from an element included in the vector.

6. The method of claim 3, wherein updating the vector includes rotating elements included in the vector.

7. The method of claim 3, wherein the updated vector is used to determine a numerical value that represents the content of the packet.

8. The method of claim 7, wherein the numerical value is inserted into the packet.

9. The method of claim 7, wherein the numerical value is used to verify payload of the packet.

10. The method of claim 1, wherein the vector is representable as $$C = (C_1, C_2, \ldots, C_n) = \left(\sum_i B_{i,1}, \sum_i B_{i,2}, \ldots, \sum_i B_{i,n}\right).$$

11. A computer program product, tangibly embodied in a machine readable storage device, for monitoring content of a packet, the computer program product being operable to cause a machine to:
produce in a first engine thread included in a processor that processes packets, a vector that represents content of the packet; and
store the vector in a memory associated with the processor such that the vector is accessible by a second engine thread included in the processor.

12. The computer program product of claim 11, wherein producing the vector includes grouping and summing the content of the packet to produce vector elements.

13. The computer program product of claim 11 being further operable to cause a machine to:
update the vector on the second engine thread included in the processor.

14. The computer program product of claim 11, wherein the vector is representable as $$C = (C_1, C_2, \ldots, C_n) = \left(\sum_i B_{i,1}, \sum_i B_{i,2}, \ldots, \sum_i B_{i,n}\right).$$

15. The computer program product of claim 13 being further operable to cause a machine to:
store the updated vector in the memory such that the updated vector is accessible by a third engine thread included in the processor.

16. The computer program product of claim 13, wherein updating the vector includes subtracting a byte from an element included in the vector.

17. The computer program product of claim 13, wherein updating the vector includes rotating elements included in the vector.

18. The computer program product of claim 13, wherein the updated vector is used to determine a numerical value that represents the content of the packet.

19. The computer program product of claim 18, wherein the numerical value is inserted into the packet.

20. The computer program product of claim 18, wherein the numerical value is used to verify payload of the packet.

21. A packet verifier comprises:
a process to produce in a first engine thread included in a processor that processes packets, a vector that represents content of a packet; and
a process to store the vector in a memory associated with the processor such that the vector is accessible by a second engine thread included in the processor.

22. The packet verifier of claim 21, wherein producing the vector includes grouping and summing the content of the packet to produce vector elements.

23. The packet verifier of claim 21, further comprises:
a process to update the vector on the second engine thread included in the processor.

24. The packet verifier of claim 21, wherein the vector is representable as $$C = (C_1, C_2, \ldots, C_n) = \left(\sum_i B_{i,1}, \sum_i B_{i,2}, \ldots, \sum_i B_{i,n}\right).$$

25. The packet verifier of claim 23, further comprises:
a process to store the updated vector in the memory such that the updated vector is accessible by a third engine thread included in the processor.

26. The packet verifier of claim 23, wherein updating the vector includes subtracting a byte from an element included in the vector.

27. The packet verifier of claim 23, wherein updating the vector includes rotating elements included in the vector.

28. The packet verifier of claim 23, wherein the updated vector is used to determine a numerical value that represents the content of the packet.

29. The packet verifier of claim 28, wherein the numerical value is inserted into the packet.

30. The packet verifier of claim 28, wherein the numerical value is used to verify payload of the packet.

31. A system comprising:
a network processor capable of,
producing in a first engine thread included in the network processor, a vector that represents content of a packet, and
storing the vector in a memory associated with the processor such that the vector is accessible by a second engine thread included in the network processor.

32. The system of claim 31, wherein producing the vector includes grouping and summing the content of the packet to produce vector elements.

33. The system of claim 31, wherein the network processor is further capable of:
updating the vector on the second engine thread included in the network processor.

34. A network forwarding device comprising:
an input port for receiving packets;
an output for delivering the received packets; and
a network processor capable of,
producing in a first engine thread included in the network processor, a vector that represents content of a packet, and
storing the vector in a memory associated with the network processor such that the vector is accessible by a second engine thread included in the network processor.

35. The system of claim 34, wherein producing the vector includes grouping and summing the content of the packet to produce vector elements.

36. The system of claim 34, wherein the network processor is further capable of updating the vector on the second engine thread included in the network processor.

* * * * *